United States Patent Office 3,328,093
Patented June 27, 1967

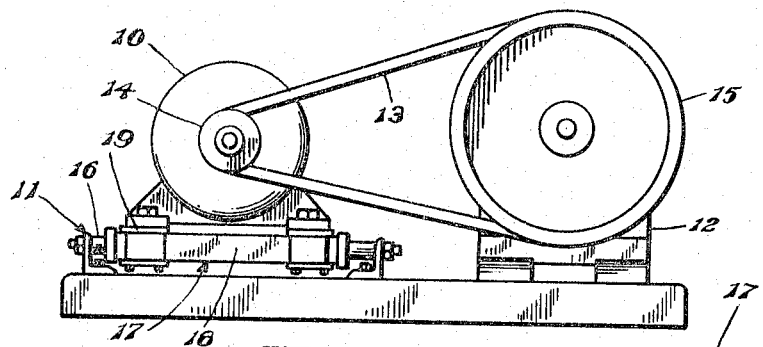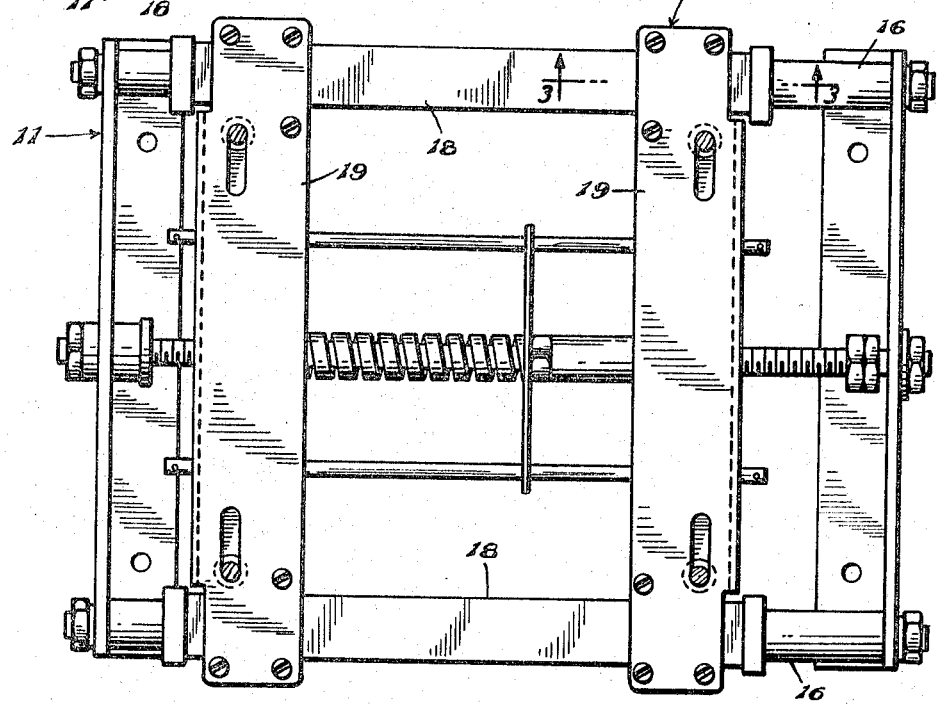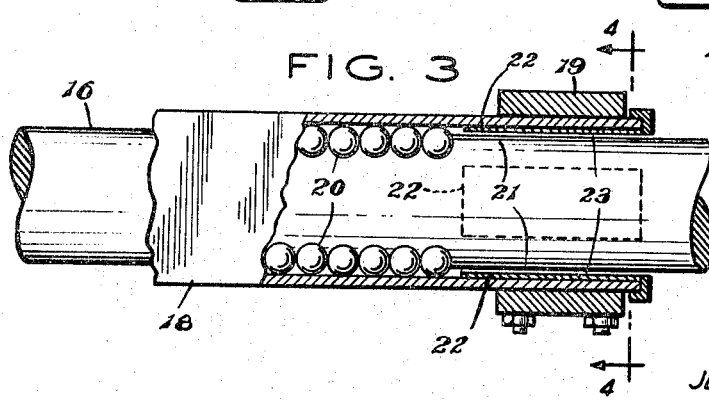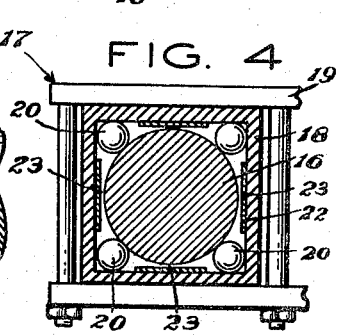

3,328,093
MACHINERY SUPPORTS WITH SLIDABLE
CARRIAGE
Jerome James Sloyan, Trenton, N.J., (% Automatic
Motor Base Co., Windsor, N.J. 08561)
Filed Nov. 5, 1964, Ser. No. 409,162
3 Claims. (Cl. 308—6)

This invention relates to machinery supports, and is an improvement upon the construction of my prior Patents 2,762,662 of Sept. 11, 1956 and 2,833,598 of May 6, 1958. In those prior patents, parallel cylindrical rods are provided as rails for mounting carriages thereon by means of gliders slidably encompassing the rails, said gliders being rectangular or square in cross-section and including antifriction means, such as balls, in the interior corners of the gliders interposed between the gliders and the rails.

The mentioned prior patents bring out the fact that in order for the balls to have latitude for rolling, there has to be a less number of balls than sufficient to fill the length of the glider. In practice, the void or space not occupied by balls is made approximately equal to one-half of the distance of permissible travel of the gliders and carriage. While provision of that amount of void accommodates continuance of rolling of the balls throughout the entire range of travel of the gliders on the rails, it obviously leaves the glider unsupported in the region of the void beyond the last ball of the series of balls. Thus a material part of the load on the carriage beyond the last ball overhangs the void and necessitates use of extra strength and stiffness of glider construction to prevent deflection of the glider. Presence of the void also increases, by leverage effect of the over-hung load, the pressure sustained by the near-by ball or balls, the result of which is brinelling and fretting of the glider and rail. Efforts to overcome these several problems in the past has been by resorting to heavier materials and heat treatments for hardening purposes, both of which exigencies increase the cost of production.

Accordingly, the present invention proposes economical means for overcoming the defects mentioned that exist in prior constructions of slidable supports for machinery.

Correspondingly of general character, the invention is directed to provision of a glider fabricated from relatively deflectable material under load, but having means deterring deflection.

More specifically, a machinery support is provided utilizing a rail and a glider with intervening balls for part of the length of the glider, leaving a void where the balls are absent, the present invention providing means capable of sustaining the glider in the region of said void.

A further object of the invention is to provide such a sustaining means which is normally out of contact from the rail.

In greater detail, the invention provides a construction permitting a minimal deflection of the glider at the region of the void and inclusion of means limiting the deflection.

Again, the invention further provides for a line contact engagement with the rail by said deflection-limiting means when brought into play.

Other objects, advantages and beneficial results of the invention will appear to persons skilled in the art to which it appertains as the description proceeds, both by direct recitation thereof and by implication from the context, and included within the broad as well as the more specific interpretations of the appended claims.

Referring to the accompanying drawing, in which like numerals of reference indicate similar parts throughout the several views;

FIGURE 1 is a side elevation of a machinery support of my invention on which is mounted an electric motor having a belt drive to a driven instrumentality;

FIGURE 2 is a plan of one of several possible embodiments of machinery support utilizing my invention;

FIGURE 3 is a longitudinal sectional view taken on line 3—3 of FIG. 2; and

FIGURE 4 is a cross-section on line 4—4 of FIG. 3.

Corresponding to the showing in my said prior patents, an arbitrarily selected exemplification of the general organization of FIG. 1, illustrates an electric motor 10 mounted on my improved support 11 driving any desired instrumentality 12 through the agency of a belt 13 and pulleys 14 and 15 respectively on the shafts of said motor and instrumentality. The general construction of said support is fully described in said patents, and as there, the present showing includes a pair of parallel cylindrical rod-like rails 16 on which a carriage, designated generally by numeral 17, is slidably mounted. The carriage includes at its opposite sides, two parallel gliders 18 of hollow rectangular or square cross-section encompassing the rails 16 and having inside dimensions greater than the diameter of the included rail. The carriage also includes means connecting the two gliders to function as a rigid unit, the means here shown comprising two cross-members 19 suitably secured in fixed relation at their opposite ends to said gliders. Motor 10 is bolted to these cross-members 19 and as the cross-members are proximate to the ends of the gliders, it follows that a large proportion of the load correspondingly applies next to the ends of the gliders.

By the use of a cylindrical rail 16 within the cross-sectionally rectangular or square glider 18, there will be a space the entire length of the glider between the adjacent or meeting walls at each corner of the square tubing comprising the glider and the cylindrical surface of the rail, and the portions of the walls defining that space function as and may be termed a raceway. There are thus four raceways provided in each glider, and in each raceway there is a series of balls 20 in successive contact with each other. The carriage 17 has a limited longitudinal movement on the rails, the range of amplitude thereof being confined approximately to the difference between the length of the rail and the length of the glider. In order for the balls to function as intended, that is, to roll in the raceways and thereby permit the gliders to move freely for their allotted amplitude longitudinally of the rails, it is essential that the raceways be not filled with balls for their entire lengths. The length not filled may be called for convenience the void 21 of the raceway. When the glider is at one end of its amplitude, the void will be correspondingly at that end of the glider, and as the glider moves toward the other end of its amplitude, the balls roll into the first-mentioned void and progressively form a new void at that said other end of the glider. The length of the series of balls is made such that the full length of the void with the glider at an end of its amplitude of movement, will be of a length substantially one half of the amplitude of movement of the glider.

The load encountered by the carriage is not only the weight of the motor, but also forces involving the reaction of the motor stator and total amount of tension which is applied to the belt. The load is even more severe when applied as a shock. Unfortunately a large part of the load is applied to that part of the glider at the end where the void exists. In other words, a large part of the load overhangs the void beyond the last ball of the series. Consequently, the load in that situation is largely supported by one or two of the nearby balls, and heretofore it has been necessary to employ a glider of increased strength and stiffness adequate to prevent it from being distorted where overhanging the void. To provide a glider fulfilling those requirements add greatly to the cost, but even with the stiffer and stronger glider, the load on the final balls of the series still remains severe. It also may be here pointed out that the balls are inherently of much harder material than that used for either the gliders or the rails, and under conditions of intermittent and servere loads, which actually occur in practice, brinelling and fretting of the glider and rail take place in the prior art constructions.

According to the present invention, a glider 18 is provided the strength of which is capable of withstanding the load when the load is applied directly over the balls, but not of stiffness necessary to fully resist and defeat deflection in the vicinity of the voids under conditions of severe load being there applied. In other words, it is recognized and expected that there will be occasions when the load will deflect the glider in the region of the void, toward the rail. To deter or limit such deflection, there are provided appropriately situated laminations on walls of the glider at the region where said voids develop in operation. In the selected showing of this feature, the lamination comprises a strip of hard material, preferably metal, secured as by welding, epoxy adhesive or otherwise, to the glider lengthwise of itself and of the glider wall. Preferably there is one such lamination secured proximate to each end of each wall at a location medially between side edges of such wall, and each one so applied constitutes a pad 22 interposed between the glider wall and the rail. Said pads are of a length commensurate to the length of the void 21 and of sufficiently less width than the wall on which secured so as not to encroach in the raceways for the balls. The pads 22 are capable of making line contact with the rail when the wall on which situated is deflected toward the rail.

In the employment of the structure above described, the internal dimensional size of the glider is made larger than the diameter of the rail to a sufficient extent to not only accommodate the added thickness of the pads 22, but to a predetermined amount greater than that, so as to provide a minimal clearance 23 under normal conditions between the pad 22 and the rail 16, and that clearance will exist between each of said pads and the rail when there is no load being encountered sufficient to deflect the glider. Having provided minimal clearance 23, pads 22 will not engage the rail unless and until the glider 18 is positioned near or at its extreme position in either direction, and then only if that portion of the glider which extends beyond the last ball of the series is deflected by a load applied in that vicinity. By providing the minimal clearance 23 between the pads 22 and rails 16, a very slight deflection of the glider 18 will cause the respective pad to make longitudinal line contact with its underlying rail. Consequently further deflection of the glider is prevented and at the same time a portion of the load, which until then, had been totally supported by the nearby end ball of the series, begins to receive support, through the pad, from the line contact with the rail. As the balls are still sharing a portion of the load, and as line contact of the pad and rail under pressure of its shared portion of the load introduces very little friction, the glider continues to be very readily slidable. Furthermore, since the pads reduce the load on the end balls of the series and since deflection of the glider is restricted to the slight amount permitted by minimal clearance 23, likelihood of brinelling is decreased and at most can attain no serious depth by virtue of limitation afforded by the pad.

It should be fully understood that the deflection of the glider is so small that it is far below the elastic limit of the material of which it is composed, and that for the slight distortion involved, the material, such as wrought iron, steel or the like, has an adequate inherent resilient characteristic to return the glider to non-deflected condition as the load lessens. It should also be clearly understood that the glider is normally in non-deflected condition and in that condition is supported entirely by the balls and with the pads out of contact from the rails and separated from the same with a minimal clearance. The clearance herein referred to is a dimension adequate to normally maintain non-contact of the pads with the rail, but small enough to result in contact with very slight deflection of the glider and small enough to obtain a return of the glider to original condition by its inherent resiliency when relieved of the deflecting load; for instance, with a glider 2" square and 16" long, having wall thickness of approximately 1/8" and a void length of 2 11/16", an appropriate clearance would be in the range of .002" to .005", and in practice a clearance of .004" has been found to be satisfactory.

The construction is one which has long life of satisfactory operation in affording consistently smooth and easy sliding of the gliders on the rails under varying conditions and intensities of loads applied to the carriage, and with all of its advantages, the construction is one that can be very readily and economically manufactured. Furthermore, as there is a lamination or pad 22 for each wall of the gliders 18 and at both ends of each glider, the support 11 of this invention will function equally well in any position in which it is mounted, whether that be horizontal on the floor or ceiling, vertical or sidewise, and under all possible conditions of application of the load.

I claim:

1. A machinery support of the character described, comprising a cylindrical rail and a hollow four-wall rectangular glider encompassing the rail, said glider having a predetermined range of amplitude of longitudinal sliding on said rail, corners of the glider in opposition to the rail providing ball raceways, balls in said raceways in linear series of less length than said raceways, a said raceway thereby having a void at one end thereof when a series of balls in said raceway is fully located toward the other end thereof, and an unyielding pad fixed on the inner surface of the glider proximate to an end thereof offset laterally from the linear series of balls entirely out of the path of movement of the balls, said pad having a location between the glider surface and rail normally out of contact from the rail but in position enabling it to make line contact with said rail for support of said glider when the glider becomes abnormally deflected toward the pad, thereby controlling deflection of the glider thereat.

2. A machinery support in accordance with claim 1, wherein a plurality of pads are provided fixed to and within said glider respectively at all four of the walls thereof, said pads being interposed between the glider and rail in the region of and at opposite sides of said voids and normally each spaced from said rail with minimal clearance in position to make contact with said rail upon deflection of the glider toward the rail in any direction radial to the rail.

3. A machinery support in accordance with claim 1, wherein a plurality of individual pads are provided fixed to and within said glider respectively at all four of the walls thereof and at each end of the glider, each pad having a location medially of the wall of the glider to which it is fixed and between the raceways and normally spaced from said rail with a minimal clearance in position to make line contact with said rail upon deflection toward the rail of the glider at least in part in direction toward which that pad faces toward the rail.

References Cited

UNITED STATES PATENTS

| 1,466,122 | 8/1923 | English | 308—6 |
| 2,025,721 | 12/1935 | Broulhuit | 308—6 |
| 2,707,659 | 5/1955 | Sloyan | 308—3 |
| 2,762,662 | 8/1956 | Sloyan | 308—6 |
| 2,787,337 | 4/1957 | Quayle | 308—6 |

FOREIGN PATENTS

| 559,326 | 2/1944 | Great Britain. |

MARTIN P. SCHWADRON, *Primary Examiner.*

L. L. JOHNSON, *Assistant Examiner.*